Nov. 29, 1938.     L. W. YOUNG     2,138,800
TORCH
Filed Sept. 15, 1933
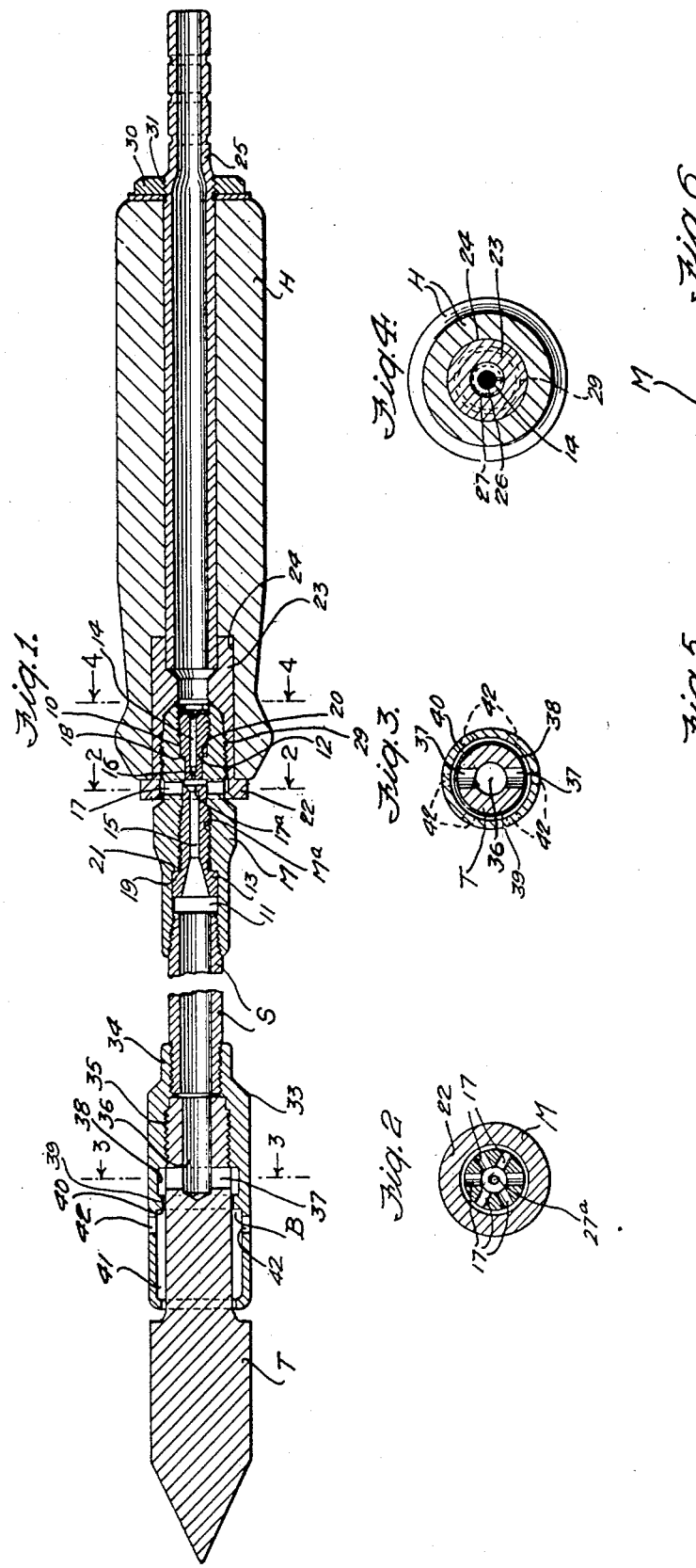
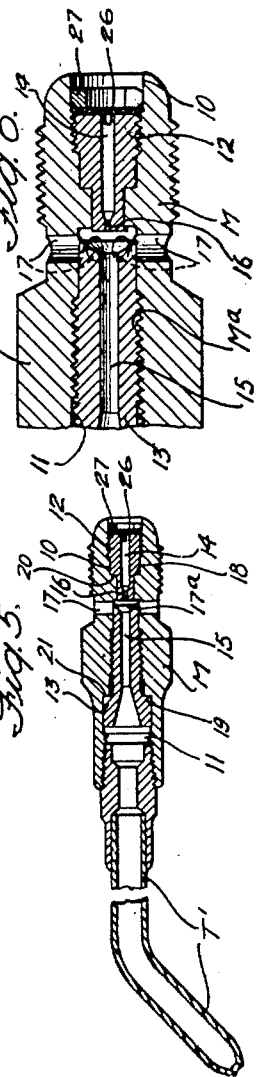
INVENTOR
LLOYD W. YOUNG
BY *E. R. Greenewald*
ATTORNEY Patented Nov. 29, 1938

2,138,800

UNITED STATES PATENT OFFICE 2,138,800

TORCH

Lloyd W. Young, Buffalo, N. Y., assignor, by mesne assignments, to Union Carbide and Carbon Corporation, a corporation of New York Application September 15, 1933, Serial No. 689,523

3 Claims. (Cl. 158—27.4)

This invention relates to torches especially adapted for soldering, welding, paint burning, and similar operations utilizing the heat of a gas flame, and has particular reference to the class of such torches which employ a mixture of air and fuel gas such as acetylene to produce the heating flame.

Heretofore, the air-acetylene mixer in some types of such torches has been provided with air inlet ducts extending through the wall of the mixer and communicating with a chamber between the axially-aligned drilled passages of the injector nozzle and the mixer throat. These axially-aligned passages are usually very small and of different diameters; hence considerable skill and precision are required in manufacturing such mixers if these passages are to cooperate efficiently. For this reason satisfactory construction of these parts has, heretofore, been attained with great difficulty. Also, the positioning and arrangement of these parts in the torch as heretofore assembled has not afforded facile interchange thereof in adapting the torch to variations in work conditions requiring changes in heat application or to easy removal of the parts for cleaning or replacement. In the use of such apparatus it is highly desirable that the mixing apparatus be accessibly located when in use while, at the same time, being protected against inadvertent closing of the air induction ducts by the operator in manipulating the torch thereby producing a carbonizing flame. With certain of such apparatus, as soldering irons, it is important that the heat of the burning gas be conserved and absorbed by the tip of the iron as much as possible and that combustion of the gas be as complete as possible in order to derive the full heat value thereof and in order to prevent clogging of the apparatus and other objectionable results of carbonization. Since such torches are frequently subjected to rough usage it is desirable that the assemblage of parts should be rugged and durable and also that there should be a balance in construction such that the torch will be easy to support in manipulation thereof.

It is, therefore, an object of the invention to provide an improved torch of the above character, in which the constructions of the injector and throat members are such as to promote facility and precision in their manufacture; in which, assembly of the mixer elements in the mixer, assembly of the mixer with other elements of the torch and interchange of mixer elements in adapting the torch to variations in work conditions are facilitated; in which induction of a uniform supply of air into the mixer, balance and ruggedness in torch construction, and uniformity in flame conditions is insured; and in which accessibility of the mixing parts while the apparatus is in use, complete combustion of the fuel gases, and conservation of the heat produced thereby is provided for.

Accordingly, the invention may comprise a torch construction including a tubular mixer member in the bore of which is secured an injector and a throat member each removable from opposite ends of the member. The mixer member is preferably located in the torch assembly at the forward end of the handle so as to be sufficiently removed from the torch flame to be very little influenced thereby and may constitute a connection between the handle and tip supporting stem. The air induction parts may be suitably shielded as by a hood against being accidentally closed and heat may be conserved at the tip by confining the flame of the torch within a sleeve surrounding the tip and vented to insure complete combustion of the flame supporting fuel gas.

Other objects and novel features of the invention will become apparent from the following specifications taken with the accompanying drawing, in which:

Fig. 1 is a view in longitudinal section of a torch constructed in accordance with this invention and showing a soldering attachment connected thereto;

Figs. 2, 3 and 4 are sectional views on lines 2—2, 3—3 and 4—4 of Fig. 1;

Fig. 5 is a view showing a gooseneck stem and tip combined replacing the soldering iron, the handle of the torch being omitted; and Fig. 6 is a fragmentary view on an enlarged scale compared with Fig. 1 in longitudinal section through the rear end of the mixer showing the injector nozzle and filter screen in place and the relation of the injector nozzle to the throat member and to the air vents in the injector body.

In order to avoid the expense of providing a separate torch for each of the multiplicity of jobs met with in small shops the apparatus of this invention provides for the interchangeability of heating parts with the same handle and for the interchangeability of mixer members to adapt the apparatus to such changes of heating parts. In the figures of the drawing are illustrated two of such interchangeable parts together with facilities adapting the apparatus for corresponding interchangeability of mixer elements. The torch illustrated in Fig. 1 comprises in its principal parts, a handle H, a tubular stem S between which and the handle is located a mixer M supplied with gas from a suitable source, not shown, through pipe 25 extending through the handle. At the outer end of the stem S is located a tip T which is, in this showing, in the nature of a soldering iron surrounded by an annular burner B.

The mixer M is an integral member and may be located, for convenience of interchanging the same and the heating elements of the torch for others of different nature and dimensions, at the front end of the handle H and may conveniently constitute a connection between the handle and the stem S. Location of the mixer between the stem S and handle H in this manner positions the same out of range of the intense heat of the torch so that no cooling thereof is necessary before removing it for repair, replacement or interchange of heating parts. Also this location of the mixer makes it possible to make these changes without disconnecting the handle from the source of supply of fuel gas and without loss of time incident thereto.

The mixer M preferably consists of a tubular body, the continuous bore Ma of which is counterbored from its opposite ends at 10 and 11 for the reception of mixing parts 12 and 13; the part 12 being in the nature of an injector nozzle and the part 13 in the nature of a throat member and are preferably threaded into the passage of the mixer body so as to partly rest in the counterbores and so as to be separately insertable and removable from opposite ends of the mixer body. These members are provided with coaxial passages 14 and 15 of small bore, each being of a diameter suitable to its purpose in the organization. The injector nozzle 12 is provided with a reduced bore 16 at its forward end positioned to discharge into the rear end of the passage or throat of the throat member 13 which is concavely rounded or tapered at 17a to facilitate this action. The formation of such a concaved construction and drilling of the passages through the injector nozzle 12 and throat member 13 with the desired precision is accomplished with difficulty in constructions of this kind heretofore known and is greatly facilitated in the present arrangement by the fact that the nozzle and throat member are separately removable from the mixer body M.

Air inlets 17 are provided in the walls of the mixer body for admission of air to the bore thereof; these inlets being positioned to discharge in the bore between the injector and throat members. There are a plurality of these inlets radially arranged with respect to the bore and protected against inadvertently being closed in the handling of the apparatus by means of a skirt or hood 22 secured in the end of the handle H so as to surround the mixer body and so as to be spaced therefrom at its forward end and to overlie the air inlets 17. The area of the gap between the skirt and injector body should be greater than the combined areas of the passages so that it can be partly closed without affecting the amount of air supplied to the mixer. This skirt 22 may conveniently constitute the forward end of a tubular connection block 23 secured in a socket 24 in the forward end of the handle by a suitable connection, as by soldering or welding it to the pipe 25. The connection block has a gas passage therethrough, and the gas mixer M has a portion thereof removably secured in the passage in block 23.

The passages 14 and 15 through the injector and throat members may be protected from being clogged by foreign substances in the fuel gas by suitable filtering means, as a screen 26 preferably of finer mesh than the bores of the passages; the screen being held against the rear end of the injector member 14 by suitable means, as a resilient split ring 27 which is pressed into the end of the counterbore 10 of the mixer body. The rear end of the mixer body is threaded into a counterbore 29 formed in the tubular block 23 and coaxial with the bore therethrough.

The handle H may be secured on the pipe 25 against movement relative thereto by provision of a nut 30 threaded at 31 to the pipe 25 at the rear end of the handle by which the block 23 may be drawn tightly into the socket 24 and the skirt 22 at its forward end may be in the nature of a flange which rests against the forward end of the handle when the block is drawn tightly into the socket. The handle is preferably of durable construction such as will not crack, split, warp or conduct heat to the hand, and to this end it may be made of a large number of turns of fibrous material impregnated with cement.

The tip at which the gaseous mixture supplied to the torch is consumed may be of either of the types shown in Figs. 1 or 5 or may be of any other form suitable to the work at hand. The form shown in Fig. 1 is particularly adapted to soldering irons and comprises a soldering iron tip T of a suitable metal, as copper, secured to the stem S by a sleeve 33 to which both the stem and the tip are threaded respectively at 34 and 35. The rear end of the soldering iron has a bore 36 coaxially with that of the stem S when connected thereto and a plurality of cross drillings 37 are provided at the forward end of this bore (as shown in Fig. 3 two in number). These cross drillings connect with the bore 36 and discharge into an annular distributing chamber 38 formed between the soldering tip T and the sleeve 33 by providing an annular recess in the latter. An annular discharge passage 39 of constricted cross sectional area compared with chamber 38 is provided between the soldering tip T and an internal rib 40 formed on the sleeve 33. Gas passing through this passage discharges into a chamber 41 also formed between the soldering tip T and the sleeve 33 where it is burned in confinement; the walls of the sleeve 33, preventing dissipation of the heat in the air and causing it to be absorbed by the soldering tip. The sleeve is provided at the rear end of chamber 41 with a plurality of apertures 42, equidistantly spaced apart and through which air is admitted to complete combustion of the gas but, aside from these apertures, the wall of the sleeve is imperforate. Preferably the length of chamber 41 is such as to accommodate the whole of the flame and the forward end of the chamber wall is spun down toward the soldering tip leaving only a small annular gap for escape of the products of combustion. With this arrangement of parts, no appreciable part of the flame is exposed to the heat dissipating influence of the atmosphere but, at the same time, the flame is visible through the apertures 42 from any direction. The tip T' shown in Fig. 5 may be used interchangeably with the tip T shown in Fig. 1 and obviously the detachable injector and throat member may be replaced by others having different characteristics from those shown and described adapting the torch to varying conditions of work and to the requirements of the particular tips used therewith.

While only two interchangeable members are shown in the drawing, it is to be clearly understood that the number and character thereof provided will depend upon the variations in jobs to be performed and the invention is not to be considered as limited in any sense to these two forms.

I claim:

1. In a torch, a handle having a bore therein and a socket at one end of said bore, a gas conduit in said bore, a tubular connection block in said socket and secured to said conduit whereby said block is held in position, said block being provided with a skirt at the end remote from said conduit, a mixer comprising an integral tubular body having ports therein, the bore of said mixer flaring outwardly in both directions from said ports, an injector in said bore on one side of said ports and a throat member in said bore on the other side of said ports, means for holding said mixer in said block in such a position that the ports are protected by the skirt, and a burner carried by said mixer.

2. In a torch, a handle having a gas passage therethrough and a socket in its forward end; a tubular connection block secured in the socket; a stem; and a unitary mixer having its rear end fastened in said tubular block and having its forward end fastened to the rear end of said stem; said mixer comprising an integral tubular body having air inlets radially arranged therein, an injector in the bore of said tubular body behind the air inlets therein, and a throat member in the bore of said tubular body ahead of the air inlets; said block having a skirt formed on the forward end thereof for surrounding and overlying the air inlets in said tubular body.

3. An assembly for use with a torch comprising, in combination, a block adapted to be secured within the handle of said torch; a gas mixer having one end thereof removably secured in said block, said mixer having an axial passage therethrough and a series of radial passages leading from the atmosphere to said axial passage; injector and throat members in said axial passage and being separately insertable and removable from opposite ends of said axial passage; and a skirt portion integral with said block for surrounding and overlying said radial passages in said mixer.

LLOYD W. YOUNG.